(12) United States Patent
Abe

(10) Patent No.: US 8,151,274 B2
(45) Date of Patent: Apr. 3, 2012

(54) TASK MANAGEMENT SYSTEM

(75) Inventor: Mutsumi Abe, Tokyo-to (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1441 days.

(21) Appl. No.: 10/581,054

(22) PCT Filed: Dec. 3, 2004

(86) PCT No.: PCT/JP2004/018442
§ 371 (c)(1),
(2), (4) Date: May 30, 2006

(87) PCT Pub. No.: WO2005/055050
PCT Pub. Date: Jun. 16, 2005

(65) Prior Publication Data
US 2006/0277548 A1    Dec. 7, 2006

(30) Foreign Application Priority Data
Dec. 5, 2003   (JP) ................. 2003-406794

(51) Int. Cl.
*G06F 9/46*    (2006.01)
(52) U.S. Cl. ..................................... 718/107
(58) Field of Classification Search .......... 718/108, 718/107
See application file for complete search history.

(56) References Cited

U.S. PATENT DOCUMENTS

| | | | |
|---|---|---|---|
| 5,357,512 A | 10/1994 | Khaira et al. | |
| 5,608,894 A | 3/1997 | Kawakami et al. | |
| 5,794,036 A | 8/1998 | Gomi et al. | |
| 6,052,707 A | 4/2000 | D'Souza | |
| 6,061,709 A * | 5/2000 | Bronte ........................ | 718/103 |
| 6,304,866 B1 | 10/2001 | Chow et al. | |
| 6,385,638 B1 | 5/2002 | Baker-Harvey | |
| 6,961,934 B2 * | 11/2005 | Alford et al. .................. | 718/100 |
| 7,284,244 B1 * | 10/2007 | Sankaranarayan et al. ... | 718/104 |
| 2002/0152256 A1 * | 10/2002 | Wetzel et al. ................. | 709/107 |
| 2003/0046324 A1 * | 3/2003 | Suzuki et al. ................. | 709/100 |
| 2005/0149927 A1 | 7/2005 | Abe | |

FOREIGN PATENT DOCUMENTS

JP    02-139630    5/1990
(Continued)

OTHER PUBLICATIONS

Baker T P, et al.: "The Cycle Executive Model and ADA", Proceedings of the Real Time Systems Symposium, Huntsville, Dec. 6-8, 1988, Washington, IEEE Comp. Soc. Press, US, vol. Symp. 9, Dec. 6, 1988, pp. 120-129.

(Continued)

*Primary Examiner* — Meng An
*Assistant Examiner* — Blake Kumabe
(74) *Attorney, Agent, or Firm* — Kenyon & Kenyon LLP

(57) ABSTRACT

A task management system for executing a task selected from tasks structuring a task combination, includes a judging unit for judging whether there is a task combination switchover request or not, a switchover unit for switching over the task combination after completing an execution of a specified task in the tasks structuring the task combination before the switchover when judging that there is the switchover request, and an execution unit for executing the task selected from the tasks structuring the task combination switched over by the switchover unit.

2 Claims, 5 Drawing Sheets

FOREIGN PATENT DOCUMENTS

| | | |
|---|---|---|
| JP | 05-307478 | 11/1993 |
| JP | 07-038510 A | 2/1995 |
| JP | 07-182183 | 7/1995 |
| JP | 07-262025 A | 10/1995 |
| JP | 08-212064 | 8/1996 |
| JP | 10-240548 A | 9/1998 |
| JP | 2003-122139 | 4/2003 |

OTHER PUBLICATIONS

Andre J-M, et al.: "OX: ADA Cycle Executive for Embedded Applications" International Symposium on On-Board Real-Time Software ISOBRTS, Jan. 1996, pp. 241-245.

Anonymous: "Providing an Application with Limited Control of Preemption" IBM Technical Disclosure Bulletin, vol. 38, No. 9, Sep. 1, 1995, pp. 187-188.

\* cited by examiner

FIG. 2A

| PATTERN NUMBER | TASK ID1 | flag | TASK ID2 | flag | ... | TASK IDn | flag |
|---|---|---|---|---|---|---|---|

FIG. 2B

| PATTERN NUMBER | TASK LIST | | | | | | | | |
|---|---|---|---|---|---|---|---|---|---|
| 1 | TASK ID | flag | TASK ID | flag | ... | TASK ID | flag | | |
| 2 | TASK ID | flag | TASK ID | flag | ... | TASK ID | flag | | |
| ... | | | | | | | | | |
| n | TASK ID | flag | | | ... | TASK ID | flag | | |

TASK MANAGEMENT SYSTEM

This is a 371 national phase application of PCT/JP2004/018442 filed 3 Dec. 2004, claiming priority to Japanese Patent Application No. JP 2003-406794 filed 5 Dec. 2003, the contents of which are incorporated herein by reference.

TECHNICAL FIELD

The present invention relates to a technology for quickly switching over a task combination in a task management system for executing a task selected from tasks structuring the task combination.

BACKGROUND ARTS

The present applicant previously filed applications (Patent Document 1, etc.) with the invention for executing a task selected from tasks (which may be singular or plural) structuring a task combination.
Patent Document 1: Japanese Patent Application No. 2003-122139
Patent Document 2: Japanese Patent Application Laid-Open Publication No. 7-182183
In the preceding applications, the task combination is switched over after waiting for a completion of an executable task in the tasks structuring the task combination. Quick switchover cannot be attained by effecting the switchover after waiting for the completion of the task. Further, there might be presumed a case where the task must not be executed depending on a switchover factor as in the case of desiring to immediately interrupt the task before being switched over.

DISCLOSURE OF THE INVENTION

It is an object of the present invention to provide a technology capable of quickly switching over a task combination. It is another object of the present invention is to provide a technology capable of switching over the task combination without executing a process that should not be processed.

According to the present invention which was devised to accomplish the above objects, a task management system for executing a task selected from tasks structuring a task combination, includes a judging unit for judging whether there is a task combination switchover request or not, a switchover unit for switching over the task combination after completing an execution of a specified task in the tasks structuring the task combination before the switchover when judging that there is the switchover request, and an execution unit for executing the task selected from the tasks structuring the task combination switched over by the switchover unit.

According to the present invention, when judging that there is a task combination switchover request, the task combination is switched over after completing the execution of the specified task in the tasks structuring the task combination (e.g., the present task combination) before the switchover thereof. Namely, a scheme is not that the task combination is switched over after waiting for the completion of the executions of all the tasks structuring the task combination but that the task combination is switched over after waiting for the completion of the execution of the specified task in the tasks structuring the task combination. Accordingly, the task combination can be quickly switched over.

The task management system may further include, for example, a storage unit for storing an associated relationship between the task structuring the task combination and an identifier (which is, e.g., a flag in the present embodiment) for identifying this task with the specified task. The switchover unit, when judging that there is the switchover request, switches over the task combination after completing the execution of the specified task identified by the identifier in the tasks structuring the task combination before the switchover thereof.

This is one exemplification as a method of identifying the specified task. Hence, the specified task identifying method according to the present invention is not limited to this method. The specified task may also be identified by other methods.

With the scheme described above, the specified task can be identified simply by checking the identifier, and it is therefore possible to quickly grasp the completion of the execution of the specified task identified by such an identifier. Further, when setting the identifier associated with the task that must not be executed depending on a switchover factor, and even if there exists the task that must not be executed depending on the switchover factor as in the case of desiring to immediately interrupt the task before being switched over, such a task can be identified simply by checking the identifier. The execution of such a task can be therefore prevented.

In the task management system, for instance, the specified task is a task of which a process completion is requested when switching over the task combination.

This is one exemplification of the specified task. Hence, the specified task according to the present invention is not limited to this task. Other tasks can be used as the specified task.

Moreover, the present invention can be specified by way of the invention of a method as follows.

A task management method of executing a task selected from tasks structuring a task combination, includes a judging step of judging whether there is a task combination switchover request or not, a switchover step of switching over the task combination after completing an execution of a specified task in the tasks structuring the task combination before the switchover when judging that there is the switchover request, and an executing step of executing the task selected from the tasks structuring the task combination switched over by the switchover unit.

Moreover, the present invention can be specified by way of the invention of a program as below.

A program makes a computer execute a judging step of judging whether there is a task combination switchover request or not, a switchover step of switching over the task combination after completing an execution of a specified task in the tasks structuring the task combination before the switchover when judging that there is the switchover request, and an executing step of executing the task selected from the tasks structuring the task combination switched over by the switchover unit.

Still further, the present invention can be specified by way of a readable-by-computer storage medium stored with the aforementioned program.

BRIEF DESCRIPTION OF THE DRAWINGS

FIG. 2A is a diagram showing data of a task combination in a task combination table.
FIG. 2B is a diagram showing a task combination management table used for task management according to one embodiment of the present invention;

BEST MODE FOR CARRYING OUT THE INVENTION

One embodiment of the present invention will hereinafter be described with reference to the drawings.

Figure 1:
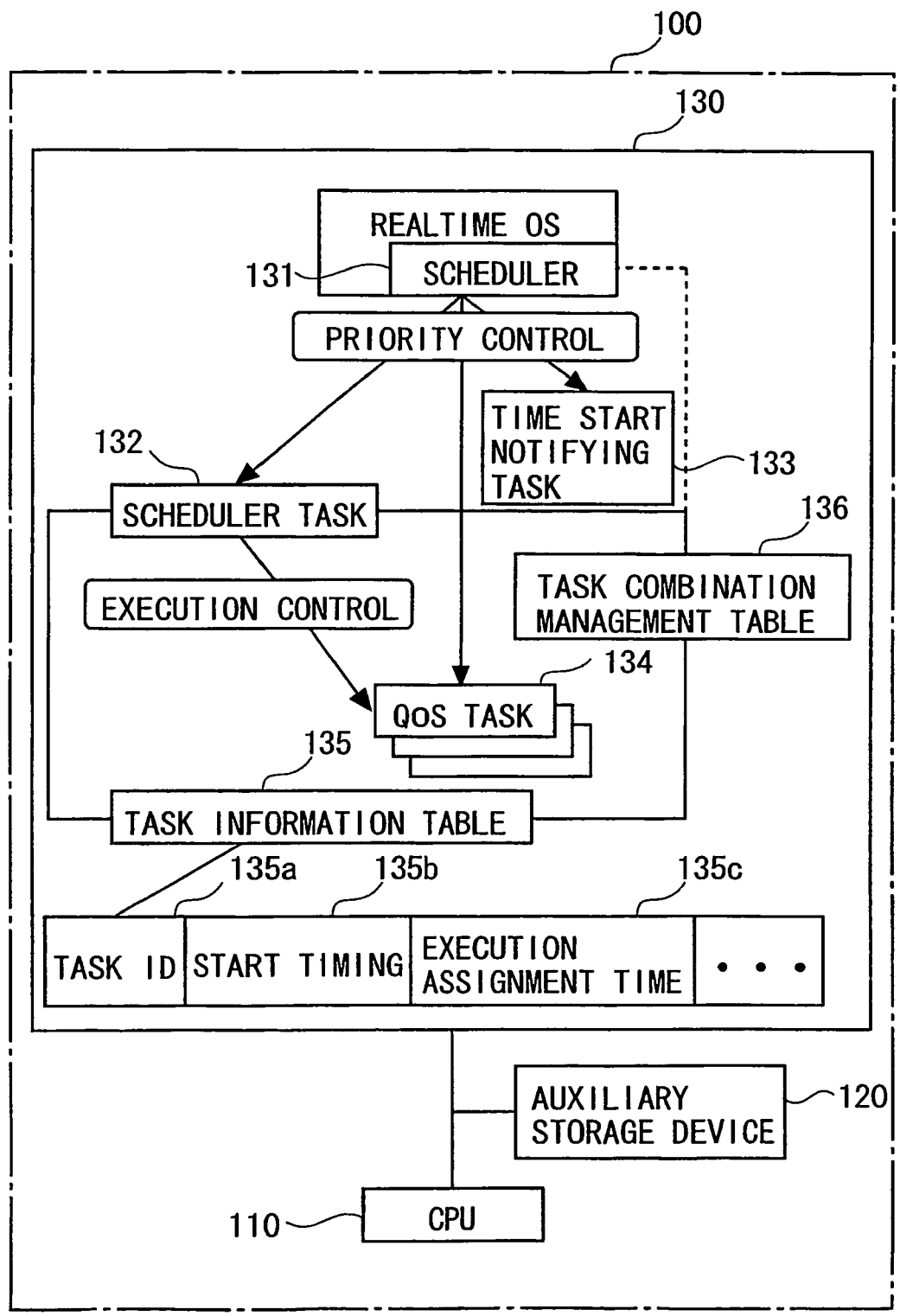
FIG. 1 is a block diagram showing a task management system according to one embodiment of the present invention.

Note that the same or corresponding components are marked with the same numerals or symbols throughout the drawings in one embodiment that follows. FIG. 1 shows architecture of a task management system in this one embodiment.

As shown in FIG. 1, the task management system in this embodiment is actualized by an information processing terminal 100 such as a PDA (Personal Digital Assistant), a personal computer and so on.

This information processing terminal 100 is constructed of a central processing unit (CPU) 110, an auxiliary storage device 120 such as a hard disc device, etc., a memory 130 such as a rewritable memory (RAM (Random Access Memory), etc., an image display device such as a liquid crystal display (LCD), a voice output device such as a loudspeaker (none of these devices are illustrated), and so forth. These components are connected to each other via, e.g., a bus.

Further, the auxiliary storage device 120 is pre-installed with a realtime OS (Operating System) and a variety of applications executable based on this realtime OP, which are, i.e., a plurality of tasks assigned priorities and a task information table that will be described later on.

These pieces of software such as the realtime OS, etc. are properly read from the auxiliary storage device 120 into the memory 130 as the necessity may arise. FIG. 1 shows a state where these pieces of software such as the realtime OS, etc. are read into the memory 130.

Further, the realtime OS is an operating system having a priority control function (or, a task management function) that executes the task assigned the highest priority among the plurality of tasks. The priority control function is actualized by a scheduler 131 included in the realtime OS.

The scheduler 131 serves to execute the task assigned the highest priority among the tasks on the basis of the priorities assigned to the respective tasks. Further, the scheduler 131 is so configured as to be capable of determining whether to execute, e.g., a timing process among processes such as controlling an application group grasped as the plurality of tasks assigned the priorities and controlling the variety of devices.

To be specific, the scheduler 131 consecutively executes (processes) the task assigned the highest priority among the tasks that are neither in a terminated status nor in a queued status. At this time, in the realtime OS, a task assigned a low priority might not absolutely operate. Moreover, the scheduler 131 serves to manage the statuses of the respective tasks, which are, to be specific, an executable status, an execution status, the queued status and so on.

The plurality of tasks, of which the priorities are controlled by the scheduler 131, are exemplified such as a scheduler task 132, a time start notifying task 133, a QoS (Quality of Service) task 134 and so on. Priorities are assigned to these tasks.

It is to be noted that the scheduler task 132 is assigned the highest priority (that is higher than those other tasks 133, 134, etc.).

Further, the scheduler task 132 is a task for controlling the execution of other task (the QoS task 134). The scheduler task 132 performs the control of executing other task, such as determining an execution task from within the QoS tasks 134, changing the priority of the execution task and controlling a required resource quantity (a resource allocation) of the execution task.

Further, the time start notifying task 133 serves to make the scheduler task 132 transition to an execution status (running status). For attaining this, the time start notifying task 133 informs the scheduler task 132 of a predetermined notification such as an event flag or a semaphore, etc. at an interval of a predetermined period (a fixed period or a set time). Upon receiving the predetermined notification, the scheduler task 132 transitions to the execution status and controls the execution of other task (the QoS task 134). Note that when the scheduler task 132 is not in the execution status, the QoS task 134 is controlled by the scheduler 131 in the realtime OS.

Further, the QoS task 134 is a variable task capable of controlling a required resource quantity. Then, the required resource quantity is sectioned into an assurance part that should be assured at the minimum and a controllable part, and is therefore so structured as to be capable of retaining a minimum quality (the assurance part).

Moreover, a task combination management table 136 is stored with combinations of the tasks extracted by the CPU 110 on the basis of application configuration information and required resource quantity information of the respective tasks. One example of this task combination management table 136 is shown in FIG. 2B.

To be specific, data of the task combination in the task combination table 136 represents, as shown in FIG. 2A, a combination of the extracted QoS tasks 134 (a task combination), and consists of a pattern number for identifying the task combination and a list (a task list) in which the tasks belonging to the pattern number are combined.

Further, the task list is stored with a task identifier ID (a task ID) unique to each QoS task 134 and with a flag "flag", and structure information and the flag "flag" of the QoS task 134 are read from the task information table 135, etc. according to the necessity. The flag "flag" is a flag for indicating whether or not a completion of the process is requested when switching over the task combination. An associated relationship between the task ID and the flag "flag" in the task list in the task combination management table 136, corresponds to an associated relationship between a task constituting the task combination and an identifier for distinguishing this task from a specified task according to the present invention. Detailed pieces of information of the QoS tasks 134 are stored in the task information table 135 and can be each extracted in a way that uses a task ID 135$a$ as an identifier.

Then, as shown in FIG. 2B, the task combination management table 136 in one embodiment is structured of at least one tuple of the pattern number shown in FIG. 2A and the task list belonging to this pattern number, wherein the task lists are so stored as to be distinguishable from each other by the pattern numbers.

Then, the application selects a predetermined task list from the task combination management table 136 stored with the plurality of task lists distinguishable by the pattern numbers. Based on the task ID and the flag "flag" in the task list belonging to the selected pattern number, a predetermined QoS task 134 is read out of the task information table 135, and the application executes the process.

Further, the task combination management table 136 according to this one embodiment is generated for every application and is stored on, e.g., the auxiliary storage device 120. Moreover, the task combination management table 136, which has been once generated, is associated with every application and is read from the auxiliary storage device 120 into the memory 130 according to the necessity such as starting the application, and so on. Then, in the application, the task combination is extracted from this readout task combination management table 136.

Thus, the task combination management table 136 is generated beforehand for every application, and a necessary task combination is selected from the task list and executed, thereby eliminating the necessity of executing a calculation process about whether or not the task execution based on the execution of the application can be done each time the task is registered. This enables the start and the switchover of the task to be smoothly performed by eliminating a loss of time.

Note that the task combination management table 136 is stored on the auxiliary storage device 120, and, when selecting the pattern number that will be explained later on, the necessary pattern can be also read.

Further, the task information table 135 is a table for managing the information on the QoS tasks 134. The task information table 135 is structured of a task identifier (a task ID) 135a, and a variety of information items such as a start timing 135b, an execution assignment time 135c, etc. which belong to this task ID 135a. Note that the task ID 135a is an identifier ID for identifying the QoS task. The start timing 135b is a period of time (period) from an execution start point of the QoS task till a next execution start point thereof.

Then, when a certain QoS task is executed, this QoS task is never executed afresh during the set period. Moreover, the execution assignment time 135c is a resource quantity assigned to the QoS task and is a period of operating time of, for example, the CPU in this one embodiment.

The task management system according to this one embodiment is configured in the way described above. Note that the task management system explained above is just one exemplification and is not limited to the architecture given above. It is possible to adopt other task management systems such as a task management system having no setting of the scheduler task but configured to utilize the scheduler for scheduling all the tasks in the realtime OS.

Figure 3:
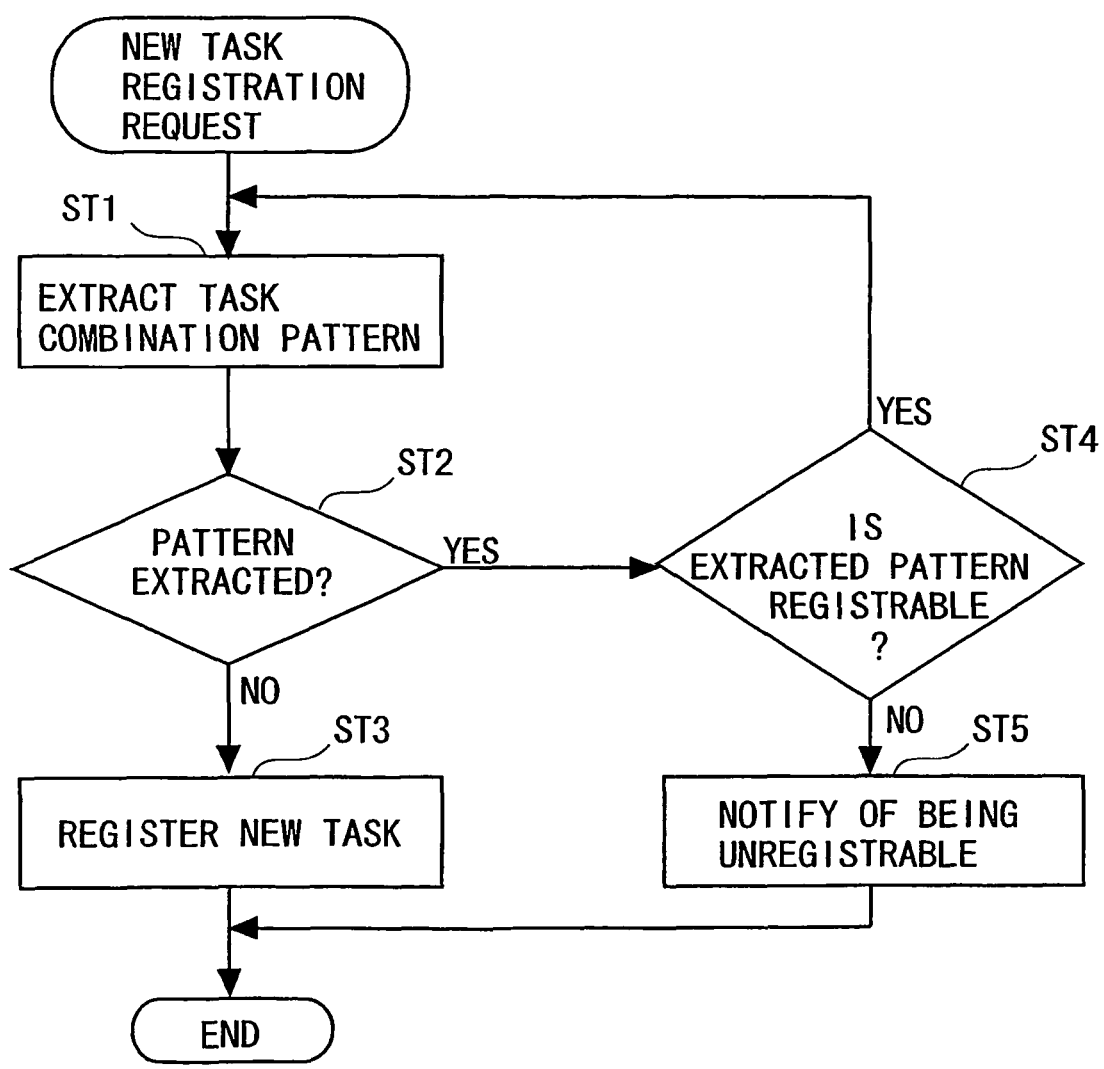
FIG. 3 is an explanatory flowchart of a new task registration method in a task management method according to one embodiment of the present invention.

Next, an operation of the thus-configured task management system will be explained with reference to the drawings. FIG. 3 shows a new task registration request operation in this one embodiment.

(New Task Registration Request)

To begin with, when starting the application, a so-called new task registration request process is executed, wherein the registration is done after making a task reservation judgment about all the patterns of the previously-extracted and required QoS control task combinations on the basis of the application configuration information. The following is an explanation of this new task registration request process.

Namely, as shown in FIG. 3, in the new task registration request process according to this one embodiment, at first, a process of extracting a task combination pattern in step ST1. Specifically, a task combination possible of becoming one function as a result of being combined and executed, is extracted from the task combination management table 136 on the basis of the application configuration information and the required resource quantity information of the respective QoS tasks 134. Thereafter, the operation proceeds to step ST2.

Next, it is judged in step ST2 whether the task combination pattern is extracted or not, i.e., whether the extraction pattern exists or not. As a result, if the extraction pattern of the task combination does not exist, the operation advances to step ST3, wherein a new task is registered by the application.

While on the other hand, if the task combination pattern is extracted in step ST2, i.e., if there exists the extraction pattern coincident with the task combination based on the application, the operation moves to step ST4.

In step ST4, it is judged whether or not the extraction pattern can be registered as new tasks. To be specific, a combination of the extracted tasks is verified, for instance, a load and the QoS in an operating environment are verified. If the load is under a predetermined reference value and if the QoS is over a predetermined reference value, this is judged to be executable. Whereas if not, a negative judgment is made.

Then, in step ST4, if the task combination is judged to be unexecutable, the extraction pattern cannot be registered, and the operation proceeds to step ST5, wherein a notification of being unregistrable is made. This notification of being unregistrable is given to a component for accepting the task in the task management system in which the quality of service (QoS) can be set. Through the operation described above, a series of new task registration processes are terminated.

On the other hand, as a result of the judgment in step ST4, if the task combination can be executed, the extraction pattern is considered registrable, and the operation moves to step ST1. Then, the task combination pattern is again extracted based on the application configuration information, and it is judged in step ST2 in the same manner as above whether or not the extraction pattern exists or not.

The processes in steps ST1, ST2 and ST4 are repeatedly executed till an unregistrable extraction pattern comes out or the extraction patterns come to vanish.

Thereafter, at a stage that all the task combination patterns have been extracted in step ST2, the operation advances to step ST3, wherein the application registers the new tasks, and the new task registration process come to an end.

Further, during an execution of the repetitive registration process, if an unexecutable task combination appears with the result that the extraction pattern cannot be registered in step ST4, the scheduler task 132 is notified of being unregistrable in step ST5, and the new task registration process is terminated.

(Task Scheduling)

Given next is an explanation of the task management during the execution of the application after carrying out the new task registration process when starting the program. Namely, during the execution of the application, the so-called task scheduling is conducted, wherein the task to be operated is executed afresh, and switchover between the tasks is performed. The task scheduling according to this one embodiment will hereinafter be described.

Figure 4:
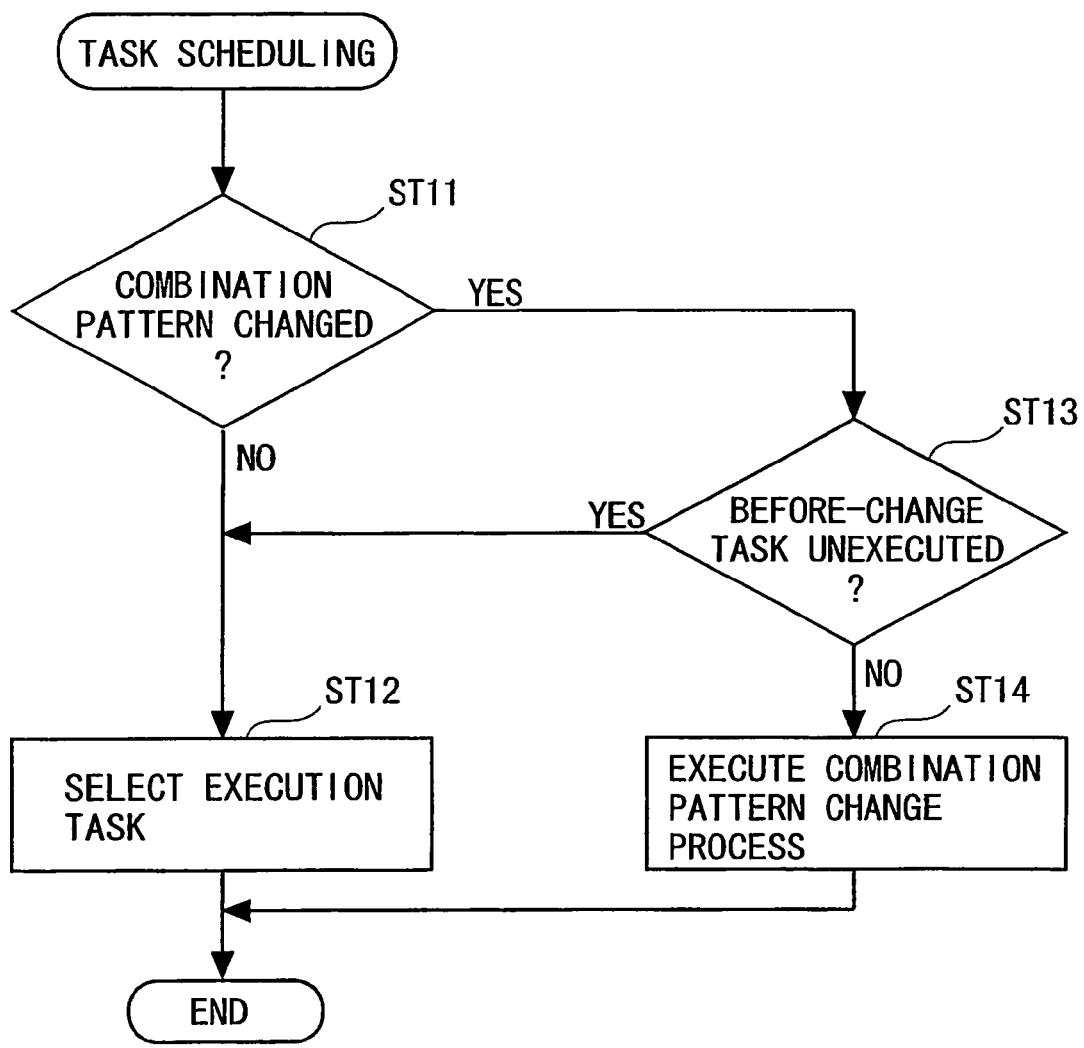
FIG. 4 is an explanatory flowchart of a task switchover method in the task management method according to one embodiment of the present invention.

To be specific, as shown in FIG. 4, in the task scheduling according to this one embodiment, at first, it is judged in step ST11 whether the task combination pattern is changed or not, i.e., it is judged whether there is a task combination pattern switchover request or not (which corresponds to a judging unit according to the present invention). This judgment is made by, for instance, comparing a present task combination pattern number with a task combination pattern number with the switchover request made. Then, if these pattern numbers are different, this implies the task combination pattern change, i.e., it is judged that there is the task combination pattern switchover request (step ST11: Yes).

When judging that there is not the task combination pattern change (step ST11: No), the operation moves to step ST12, wherein the execution task is selected from the tasks structuring the present task combination, and this selected execution task is executed by the CPU 110 on the basis of the application.

While on the other hand, when judging that there is the task combination pattern change (step ST11: Yes), the operation proceeds to step ST13, wherein it is judged whether or not a task (corresponding to a specified task according to the present invention) of which a processing completion is requested when changing the task combination is contained in the tasks (that may be a single task or a plurality of tasks) structuring the task combination (e.g., the present task combination) before the change (switchover). The flag "flag" in the task combination management table 136 is referred to for this judgment. As described above, the flag "flag" is registered for every task and is also a flag indicating whether or not it is the task (corresponding to the specified task according to the present invention) of which the processing completion is requested when changing the task combination. Accordingly, the flag "flag" in the task combination management table 136 is referred to, thereby making it possible to judge whether or not the task of which the processing completion is requested when changing the task combination is contained in the tasks structuring the task combination (e.g., the present task combination) before the change (switchover).

Specifically, the judgment is made as follows. To start with, it is judged whether or not a not-yet-executed task (or an interrupted task) exists in the tasks structuring the task combination (e.g., the present task combination) before the change (switchover). Then, when judging that the not-yet-executed task (or the interrupted task) exists, a flag "flag" associated with the not-yet-executed task (or the interrupted task) is referred to. For this scheme, a judgment target task is limited to the not-yet-executed task (or the interrupted task). Hence, this eliminates the necessity of making the judgment about the execution-completed task, and consequently the judgment can be speeded up.

In this step ST13, when judging that the task (corresponding to the specified task according to the present invention) of which the processing completion is requested when changing the task combination is contained in the tasks structuring the task combination (e.g., the present task combination) before the change (switchover) (step ST13: Yes), the operation moves to step ST12, wherein the now-being-executed task combination is continuously executed by the CPU 110. Namely, the execution task is selected from the tasks structuring the present task combination, and this selected task is continuously executed based on the application by the CPU 110. The processes in ST11 through ST14 are redone each time the timing based on the task scheduling is reached. With this process, the task (corresponding to the specified task according to the present invention) of which the processing completion is requested when changing the task combination comes to non-existence in the tasks structuring the task combination (e.g., the present task combination) before the change (switchover) (step ST13: No). Then, when this task comes to the non-existence (step ST13: No), the operation advances to step ST14, wherein a combination pattern change process for changing (switching over) the combination pattern is executed. Namely, when entering a non-waiting state of the completion of the executions of all the tasks with their executions stopped and so on, the task combination is switched over. Then, since the processes in ST11 through ST14 are redone each time the timing based on the task scheduling is reached, the execution task is selected from the tasks structuring the task combination after the switchover thereof (ST12), and this selected task is continuously executed based on the application by the CPU 110 (which corresponds to the execution unit according to the present invention).

The task scheduling as a concomitant of the execution of the application according to this one embodiment is performed in the manner described above.

(Task Combination Registration Request Process)

Figure 5:
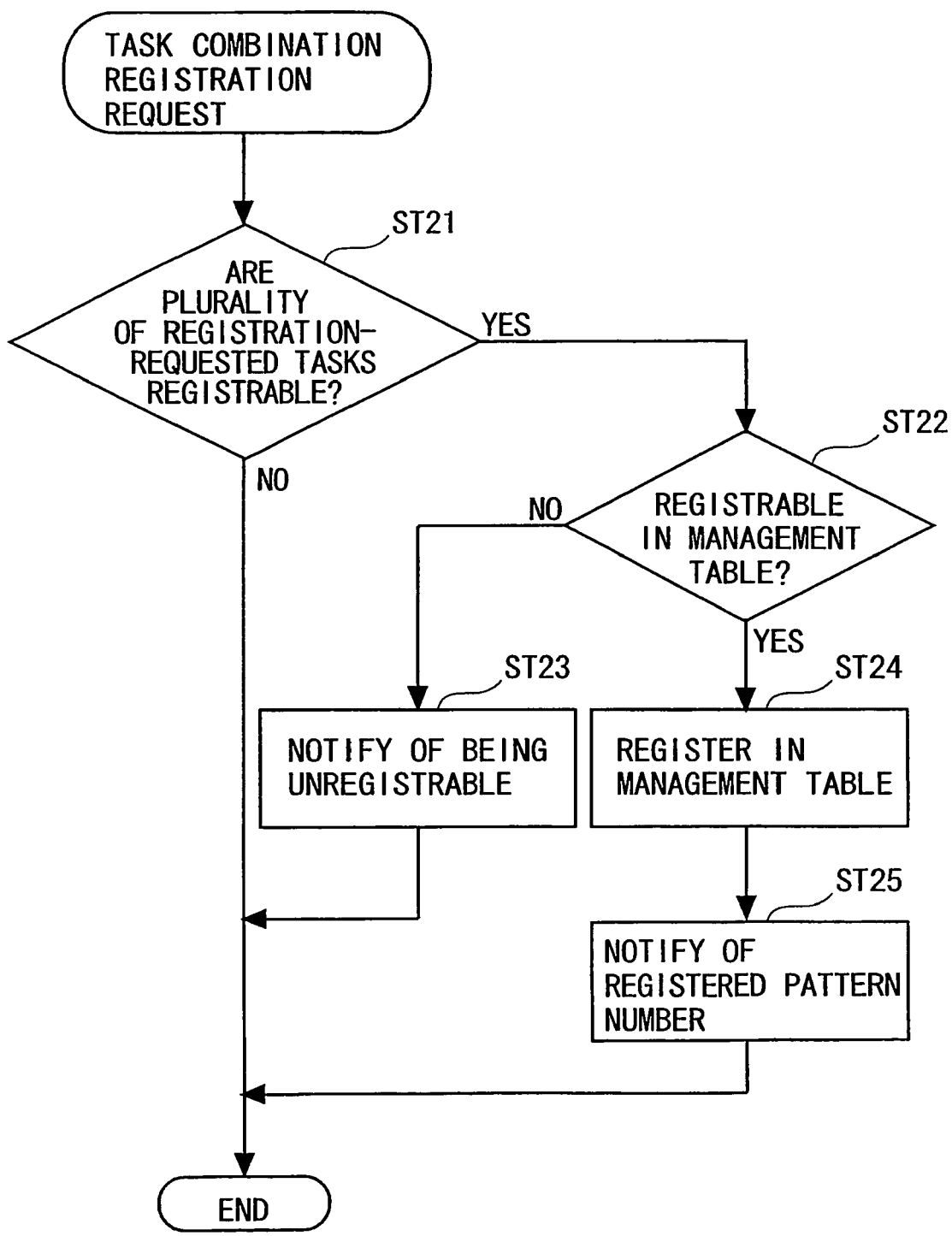
FIG. 5 is a flowchart showing a method of registering in a task combination management table in the task management method according to one embodiment of the present invention.

Given next is a description of a method of registering the task in the task combination management table 136 used when registering the new task and performing the task scheduling as described above. FIG. 5 shows a task combination registration process according to this one embodiment.

As FIG. 5 shows, when the task combination registration request is given from the application, to begin with, it is judged in step ST21 whether the plurality of tasks requested to be registered are registrable or not.

When judging in step ST21 that the plurality of tasks requested to be registered can not be executed while maintaining the QoS as the combination, i.e., if the QoS control is not executable (step ST21: No), the process of the registration in the task combination management table 136 is terminated.

On the other hand, when judging in step ST21 that the task combination can be executed while maintaining the QoS, i.e., if the plurality of tasks requested to be registered are registrable (step ST21: Yes), the operation proceeds to step ST22, wherein it is judged whether or not the tasks can be registered in the task combination management table 136.

Then, if the judgment as to whether the tasks are registrable or not in step ST22 shows that the tasks can be registered, the operation moves to step ST23, wherein the notification of being unregistrable is given. Note that this notification of being unregistrable is given to a component (such as the scheduler and the scheduler task) for accepting the task in the management mechanism for the task management in which the quality of service can be set.

While on the other hand, when judging in step ST22 that the tasks are registrable in the task combination management table 136, the operation advances to step ST24, in which a predetermined identifiable pattern number is generated, and the task combination management table 136 is registered with this pattern number and a task list consisting of a task ID and a flag "flag" of at least one task belonging to this pattern number. Then, the application, as described above, properly selects a task combination from the variety of thus-registered task combinations, and the selected task combination is executed.

Thereafter, the operation moves to step ST25, wherein the scheduler and the scheduler task, which are so structured as to be capable of selecting the task in the management mechanism for the task management in which the QoS can be set, are notified of this registered pattern number, and the task combination registration process according to this one embodiment is terminated. In the way described above, when starting the application, all the QoS tasks are registered in the task combination management table 136 within an executable range.

As discussed above, according to this one embodiment, when starting the application, the registrable QoS task combination among all the QoS tasks used for this application is registered in the task combination management table 136. Then, when executing the task in the execution of the application, on the basis of the task list registered in the task combination management table 136, a necessary task combination specified by the pattern number is executed, thereby making it possible to previously extract the task combination pattern under the QoS control of the application for executing and to eliminate the necessity of the time for judging whether or not the task combination is executable with respect to the process of the QoS task 134.

Accordingly, a loss of time expended for this judgment can be prevented, and the time for switching over the task combination can be remarkably reduced. It is also feasible to prevent the task control from getting into incapableness due to the elongated calculation time and the task registration by the application from being unable to be done. Further, the task management based on this extraction can be conducted, and the now-being executed task combination can be smoothly changed, whereby the receipt of the task reservation of the application can be surely executed and the efficient scheduling can be also executed.

Moreover, there is omitted the assignment to the task of which the process may not be completed (the task of which the process completion is not requested when switching over the task combination), and hence the task combination can be quickly switched over. Further, another effect is that the task combination can be switched over without executing the process (such as an execution of the task of which the process completion is not requested when switching over the task combination) that should not be processed.

One embodiment of the present invention has been specifically described so far, however, the present invention is not limited to one embodiment discussed above and can be modified in a variety of forms based on the technical concept of the present invention.

For example, the system architecture given in one embodiment discussed above is just the exemplification, and a system architecture different from the aforementioned architecture can be adopted as the necessity arises.

Moreover, for instance, the operating time of the CPU 110 in the operation environment is adopted as the resource quantity in one embodiment described above, however, it is possible to selectively use, other than the CPU, hardware resources and software resources necessary for executing the specified tasks, such as the operating time and a storage capacity of each of the storage device, the memory and a video memory (unillustrated), a communication speed across a network, a storage capacity of a network server, a memory capacity and so on.

INDUSTRIAL APPLICABILITY

According to the present invention, since the assignment to the task of which the process may not be completed is omitted, the task combination can be quickly switched over. Further, another effect is that the task combination can be switched over without executing the process that should be processed.

The invention claimed is:

1. A task management system for executing a task selected from a plurality of tasks, the system stored on a computer-readable medium and comprising:
   a task management table storing a plurality of task combinations, each task combination in the plurality of task combinations comprising at least one task from the plurality of tasks, the task management table comprising at least a listing of tasks stored therein, a unique identifier associated with each task stored therein, and an indication of whether each task stored therein is flagged as being a task that must complete execution prior to switching between task combinations;
   a processing unit for executing tasks in a present task combination;
   a judging unit for determining whether there is a task combination switchover request; and
   a switchover unit for, when the judging unit determines there is a task combination switchover request, switching over from the present task combination to a requested task combination,
   wherein:
      the task management table is generated and stored before executing tasks in the present task combination,
      the judging unit is adapted to determine whether there is a task combination switchover request based on a comparison of pattern numbers associated with the present and requested task combination;
      when it is judged that the task combination switchover request exists, the judging unit is further adapted to determine whether a not-yet-executed task exists in the current task combination;
      when it is judged that the not-yet executed task exists, the judging unit is further adapted to judge whether or not there exists a flagged task among the not-yet executed tasks;
      when it is judged that the flagged task exists in the not-yet-executed task, the processing unit is adapted to continue executing the task in the current task, and when it is judged that the flagged task does not exist in the not-yet-executed task, the switchover unit is adapted to switch over from the present task combination to the requested task combination; and
      the processing unit is adapted to execute tasks in the requested task combination after the switching over.

2. A task management program for executing a task selected from a plurality of tasks stored in a task management table, the task management table comprising at least a listing of tasks stored therein, a unique identifier associated with each task stored therein, and an indication of whether each task stored therein is flagged as being a task that must complete execution prior to switching between task combinations, the program stored on a non-transitory computer-readable medium and comprising the steps of:
   judging whether a task combination switchover request has been made based on a comparison of pattern numbers associated with a present task combination, including at least one task from the plurality of tasks, and a requested task combination, including at least one task from the plurality of tasks;
   when it is judged that the task combination switchover request exists, determining whether a not-yet-executed task exists in the current task combination;
   when it is judged that the not-yet-executed task exists, determining whether there exists a flagged task among the not-yet-executed task;
   when it is judged that the flagged task exists in the not-yet-executed task, executing the task in the current task;
   when it is judged that the flagged task does not exist in the not-yet-executed task, switching over from the present task combination to the requested task combination; and
   executing the tasks in the requested task combination after the switching over,
   wherein:
      the task management table is generated and stored before executing tasks in the present task combination.

* * * * *